Figure 6:
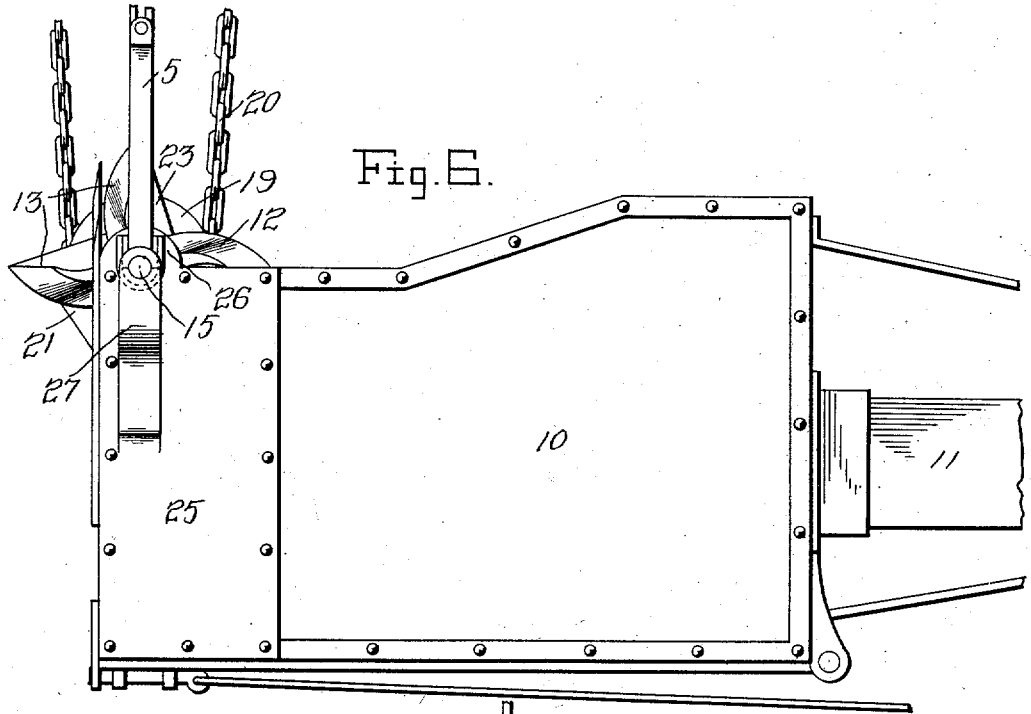

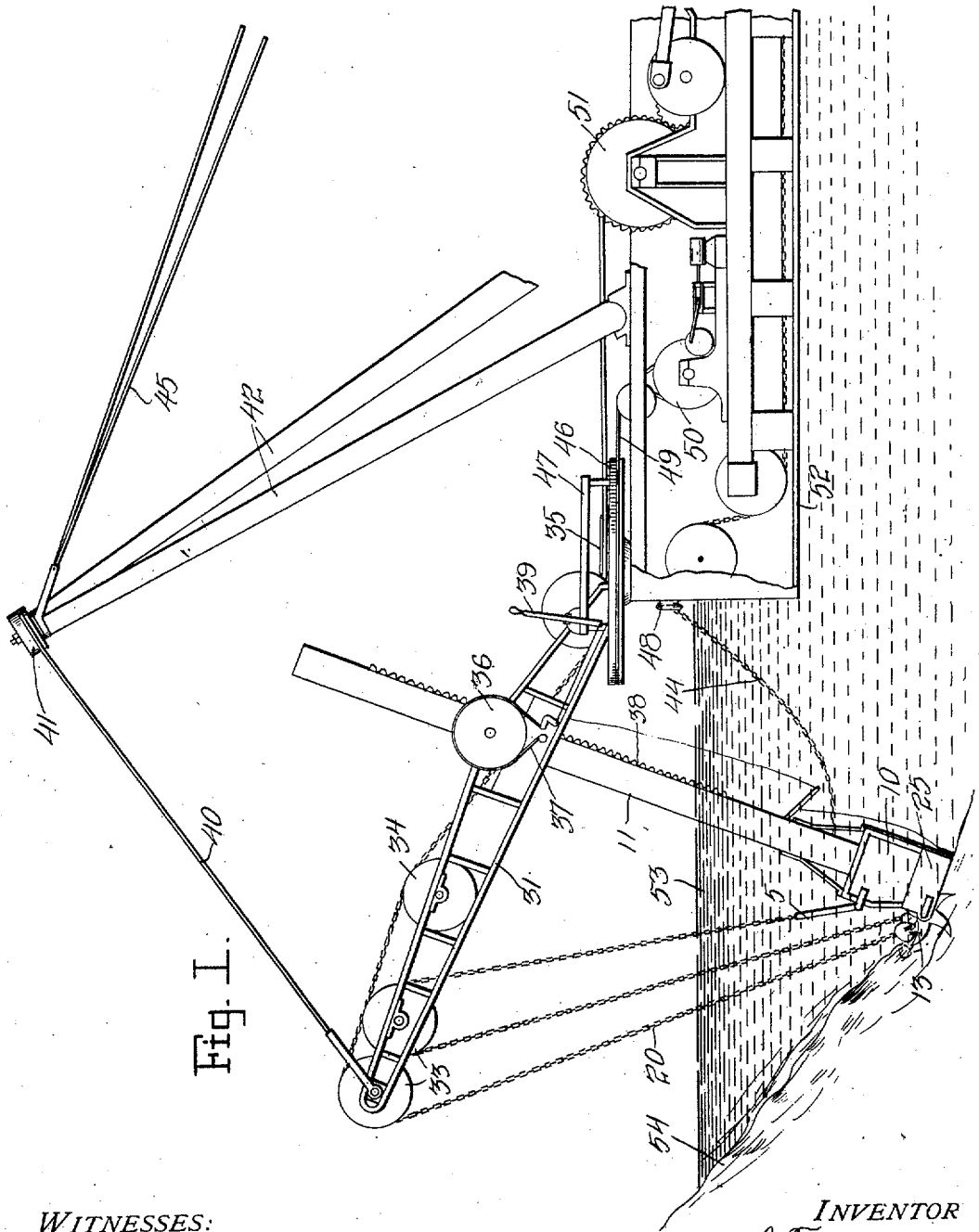

No. 883,635. PATENTED MAR. 31, 1908.
G. FRANCIS.
BUCKET FOR DREDGERS.
APPLICATION FILED SEPT. 13, 1906. RENEWED AUG. 16, 1907.
5 SHEETS—SHEET 2.
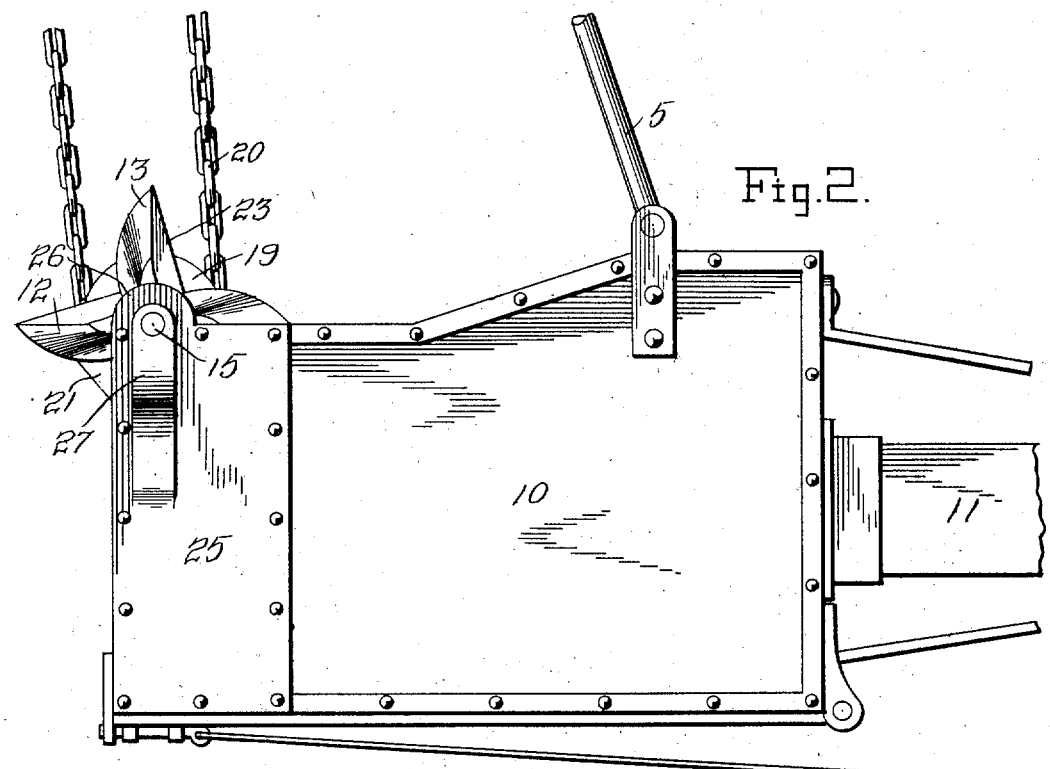
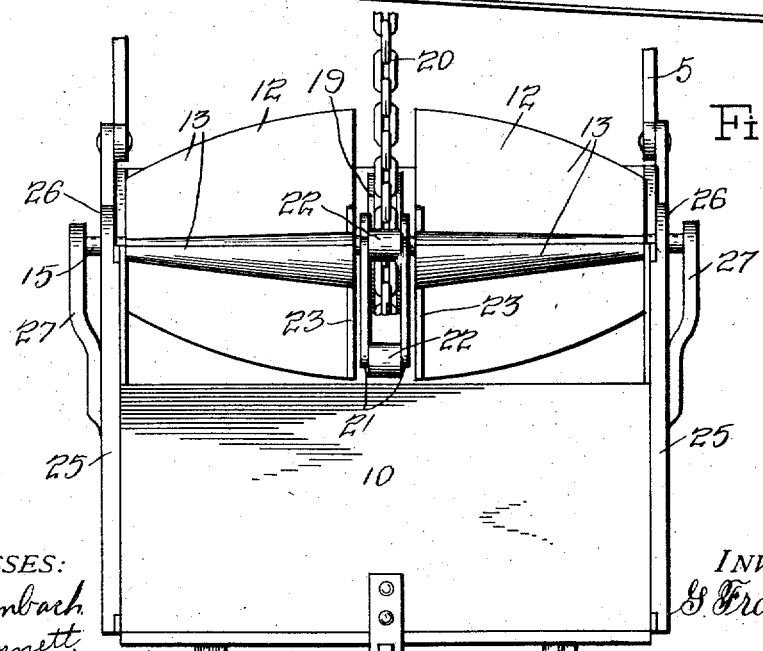
WITNESSES:
C. K. Reichenbach
G. C. Thornett
INVENTOR
G. Francis
BY
Chandler & Chandler
Attorneys.

No. 883,635. PATENTED MAR. 31, 1908.
G. FRANCIS.
BUCKET FOR DREDGERS.
APPLICATION FILED SEPT. 13, 1906. RENEWED AUG. 16, 1907.
5 SHEETS—SHEET 3.
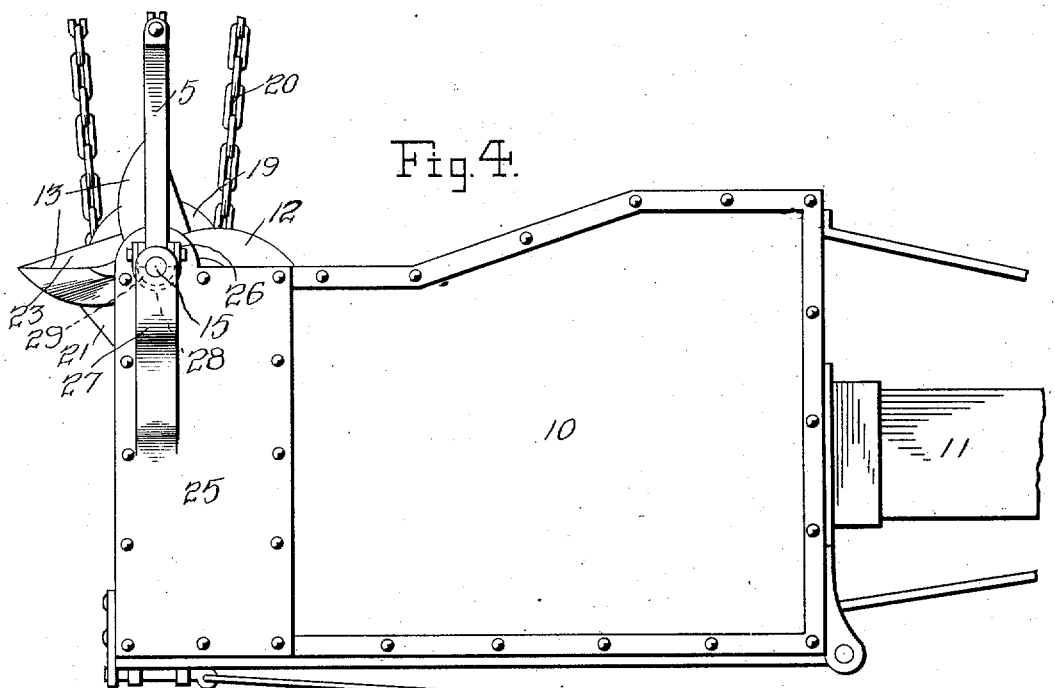
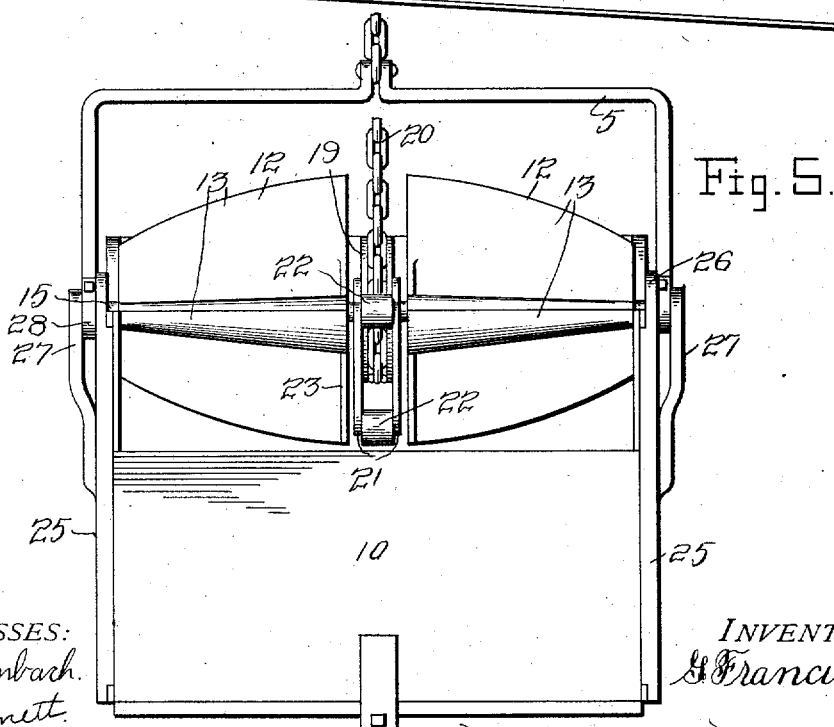
WITNESSES:
C. K. Reichenbach.
J. C. Thornett.
INVENTOR
G. Francis.
BY
Chandler Chandler
Attorneys.

No. 883,635. PATENTED MAR. 31, 1908.
G. FRANCIS.
BUCKET FOR DREDGERS.
APPLICATION FILED SEPT. 13, 1906. RENEWED AUG. 16, 1907.

6 SHEETS—SHEET 4.

WITNESSES:
C. R. Reichenbach
G. C. Thornett

INVENTOR
G. Francis
BY Chandler & Chandler
Attorneys

No. 883,635.   PATENTED MAR. 31, 1908.
G. FRANCIS.
BUCKET FOR DREDGERS.
APPLICATION FILED SEPT. 13, 1906. RENEWED AUG. 16, 1907.
5 SHEETS—SHEET 5.
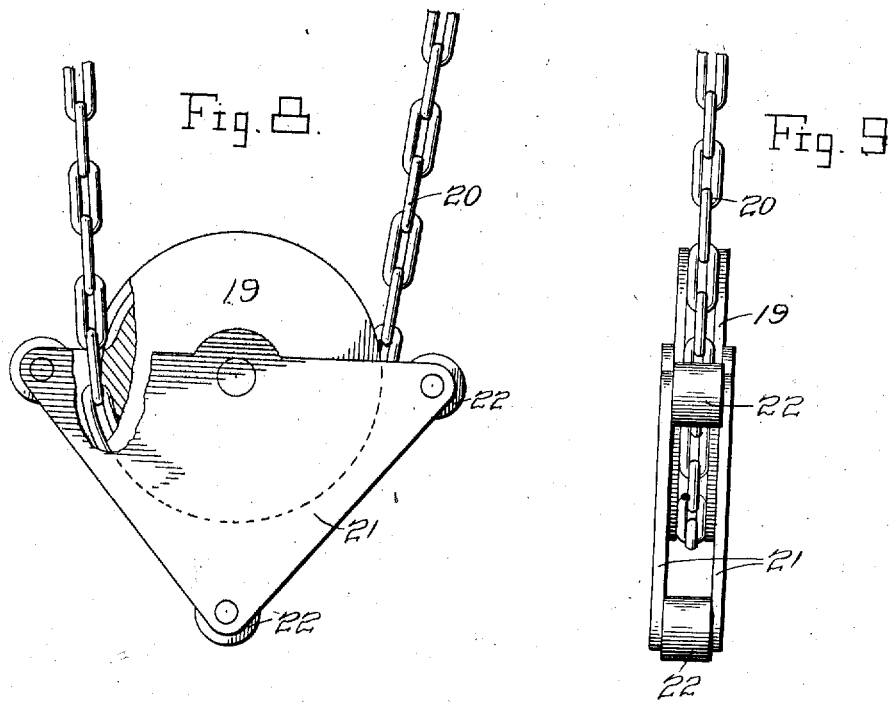
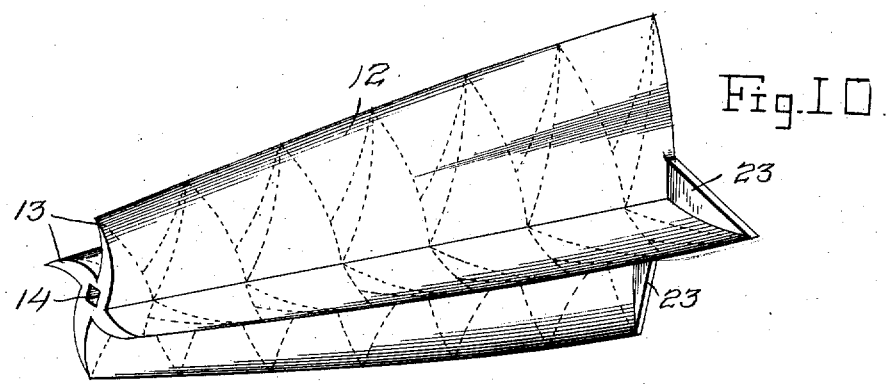
Witnesses
C. K. Reichenbach,
Y. C. Thornett.
Inventor
G. Francis,
By Chandler Chandler.
Attorneys

UNITED STATES PATENT OFFICE.

GEORGE FRANCIS, OF CHELSEA, MASSACHUSETTS.

BUCKET FOR DREDGERS.

No. 883,635.  Specification of Letters Patent.  Patented March 31, 1908.

Application filed September 13, 1906, Serial No. 334,474. Renewed August 16, 1907. Serial No. 388,865.

*To all whom it may concern:*

Be it known that I, GEORGE FRANCIS, a citizen of the United States, residing at Chelsea, in the county of Suffolk, State of Massachusetts, have invented certain new and useful Improvements in Buckets for Dredgers; and I do hereby declare the following to be a full, clear, and exact description of the invention, such as will enable others skilled in the art to which it appertains to make and use the same.

My improvements, being in the line of power shoveling and dredging apparatus, may be embodied in a machine of that general class, of any suitable size and form.

The invention consists of improvements that, for the most part, relate to the bucket and its cognate parts or means coöperating therewith, the bucket or shovel in my invention being provided with movable cutters, diggers, hoes, or means, having similar functions, for cutting or in any way digging out the earth or other material designed to be excavated in advance of the bucket, and filling the same, or getting it into readiness to be filled into the bucket.

In providing my improvements, I have, in general, discarded the lip or cutter on the front upper edge of the bucket, which lip or cutter has heretofore been operated through the intervention of the bucket itself. My movable cutters, hoes, or diggers, while being mounted on the bucket, and movable therewith are operated from the engine or other power and not through the medium of the bucket.

While the invention is not confined to any particular form of means the dredging apparatus shown in the annexed drawings will serve to show and explain the nature of the invention, in view of which said drawings it will be first described in detail, with respect to its construction and mode of operation, and then be pointed out in the subjoined claims.

Figure 7:
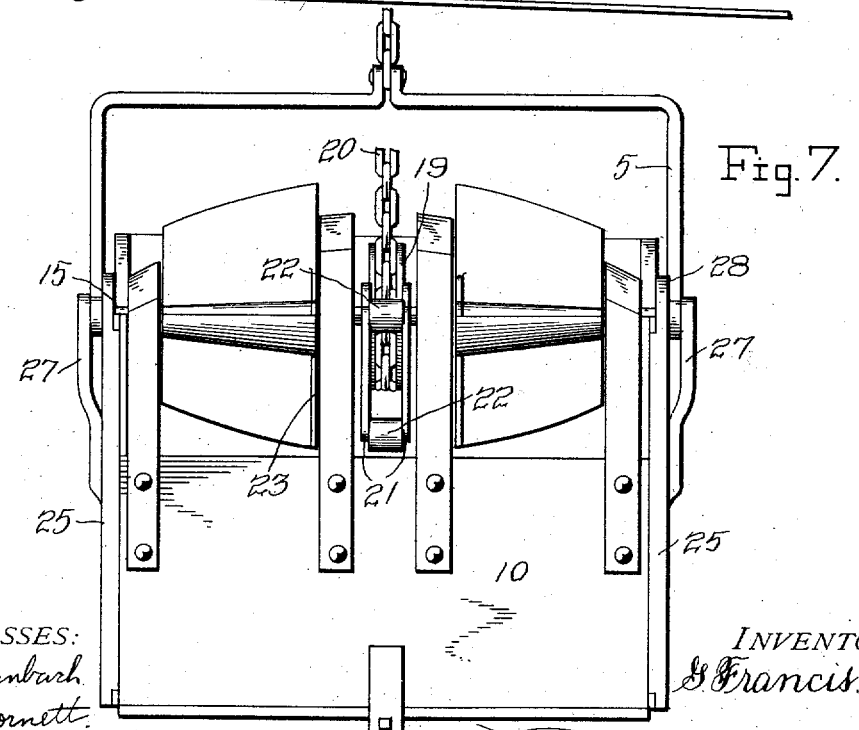

Of the said drawings—Figure 1 is a side elevation of a power-shovel or dredging apparatus embodying my improvements. Fig. 2 is a side elevation of the bucket. Fig. 3 is a front elevation of the bucket. Fig. 4 is a side elevation showing the modification of the invention. Fig. 5 is a front elevation of the structure shown in Fig. 4. Fig. 6 is a side elevation showing a third form of the invention. Fig. 7 is a front elevation of the structure shown in Fig. 6. Fig. 8 is an elevation partly in section showing the sheave carried by the bucket. Fig. 9 is a front view of the structure shown in Fig. 8. Fig. 10 is a perspective view of one of the cutters.

Similar numerals of reference designate similar parts or features, as the case may be, wherever they occur.

In carrying out my invention I support the bucket 10 on the end of the dipper handle 11 in any known or suitable and efficient way. The bucket is substantially made in order that it may endure the strain and force put upon it in its operations. Instead of providing the bucket on its upper front edge with a lip or cutter to displace the dirt or material operated upon and load it into the bucket by operating the latter through the intervention of the dipper handle, boom, and other means, I provide the front portion of the bucket with movable cutters or diggers which operate partially in front and above the bucket and cut or dig away the dirt or material being operated upon and load it, or adapt it to be loaded into the bucket. In the present case the said cutters or diggers may consist of two rotary devices, 12, each having four blades, 13 formed of solid cast steel, the edges of the said blades tapering on a curved line from their inner and meeting ends to their outer ends and having a square hole 14 formed through their longitudinal center for the reception of the square portion of their operating shaft 15, that extends through them, the projecting ends of the said shaft, which operates as trunnions or journals being rounded as will presently appear.

Between the larger ends of the cutters 13 and mounted on the same square shaft with them is a "wild cat" or sprocket sheave 19, adapted to receive about it the operating chain 20, so that as the pulley 19 is rotated the cutters 12 will be operated in like manner.

A triangular guard-plate 21 is supported on each side of the sprocket-wheel or "wild cat" 19, so disposed that their lower points extend below the said pulley while the opposing side points are on opposite sides of the axis of the pulley. Between each of the points of the guide-plates there is journaled a guard spool 22, at such distance from the chain 20 as not to interfere with its functions, but at the same time keeping the said chain from being accidentally displaced on the said sheave 19. The immediate supports for the guard-plates 21 is the shaft 15, which is rounded where they are hung so as to not turn them with it.

The ends of the cutter blades 13 adjacent to the power sheave have a web 23 extending therefrom to the base at the back of the next adjacent blade, as shown, to guard against the breakage of the said points.

The bucket, as here shown, is made higher in the rear than in the front, for reasons which will appear obvious, and as already indicated, the bucket is provided with a bail which steadies it in its operations, and to which the hoisting chain 20 is attached.

The bucket is provided on each side in front, with heavy castings, 25, bolted to the sides of the bucket, and having lugs 26 formed therewith at their upper edges which lugs are supported by braces 27 also forming a part of the castings. A round hole is formed through the bucket, castings, lug and braces for the reception of the rounded ends or trunnions of the shaft 15, before mentioned.

In operation the ends of the bail are secured on each side by a heavy strap 28 that passes about the lug 26 on the casting, each lug carrying a cast-iron or steel block bearing 29 between its lower end and the lug-bearing 26. The hoisting chain is shackled to the bail at one end, and is passed overhead and over sheave on the end of the boom back under the power sheave between the cutters and again up over a second head sheave through the lead sheaves on the boom and turn-table to the drum of the hoisting engine.

In order to more clearly understand the connection of the hoisting chain of the bucket and the "wild cat" for operating the cutters or diggers 12, as well as the means for operating the dipper-handle 11, the boom and all of the parts of a dredge-hull remotely related to the bucket, reference may be had to Fig. 1. In referring to the parts shown in said figure it will not be undertaken to do more than to merely catalogue them, since their construction, functions and relationship one to another will be understood by those skilled in the art by their bare enumeration. 11 designates the dipper-handle; 31, the boom; 10 the bucket (hard-pan dredge pattern); 5, bail of the bucket; 20, hoisting-chain; 33, head-sheaves; 34, hoisting-chain lead sheaves; 35, turn-table guide-sheaves; 36, friction-wheel of craning rig; 37, friction-belt; 38, rack on inner face of dipper-handle that engages a pinion (not shown) on the shaft of the friction wheel 36, and with the aid of the friction-belt 37 and brake hold the dipper-handle 11 in any desired position; 39, brake-lever; 40, boom-guy; 41, head-casting with revolving cap for a yoke; 42, back guys for frame 43; 44 backing chain that is operated by a pair of engines and one drum independently; 46, turn-table; 47, foot-board; 48, bow casting with hawse-pipe for backing-chain 44; 49, swinging chains for turn table; 50, swing-drum and engines to turn or swing the turn-table and boom; and 51 the main drum and engines used to hoist the bucket and dipper-handle, the hoisting chain being wound on the drum and contrived to operate the cutters or diggers 12 as it hoists, a friction belt or other friction-governing means, allowing the drum to unwind the chain, lowering the boom and the dredge-bucket, hauling in the backing-chain by its drum actuated by its engine, thus bringing the bucket and dipper-handle in vertical position, and in readiness to be operated to "attack the bank" and load the bucket. 52 is the dredge-hull; 53 indicates water; and 54 the bank of material to be dredged or excavated.

Instead of making the blades of the cutters continuous from end to end, they may be notched so as to constitute teeth as indicated by dotted lines in Fig. 13.

By employing cutters or diggers that are movable independent of the bucket, as I have described it is made impossible to stall the excavator in a heavy bank of earth since each device cuts out its whole length of the material being operated upon, besides this it works very much more rapidly, the bucket being filled in a very materially shorter time, no matter what the character of the material may be that is operated upon, than by machines of existing construction.

The invention is particularly adapted to operate upon hard clay of yellow, blue or conglomerate character as well as upon black sand and similar substances where it is difficult to simply scoop up or dig into the material to be acted upon by force exerted upon the shovel itself.

Of course, the invention is not limited to use upon the substances named since it may be operated equally as advantageously upon loose small rocky earth or upon any kind of mold that does not contain rocks too large to be taken into the shovel.

It will not require any more power with the invention shown and described on "hard pan" digging than upon an ordinary scoop bucket when the latter is operated upon ordinary soft-clay. By using my invention instead of those now commonly employed, the engine, boom, and dipper handle are relieved of a great deal of energy and strain.

It is to be noted that in all instances the movable means for cutting, digging or excavating the material in advance of the bucket and loading it into the latter are mounted upon and carried by the bucket, though actuated in the excavating operation by means independent of the bucket, as shown. This is to be kept in mind as an important feature of the invention.

As has already been set forth, I recognize the fact that changes may be made in the form and arrangement of parts and features of the machine shown as embodying from its general nature or spirit.

What is claimed, is:—

1. A power-dredge or excavating bucket provided with means mounted thereon and movable independent of the bucket, and adapted to operate on the substance to be acted upon and disengage or loosen a portion of the said substance to enable it to be loaded into the bucket.

2. A power-dredge or excavating bucket provided with means mounted on its upper forward end and movable independent of the bucket and adapted to operate on the substance to be acted upon and disengage or loosen a portion of the said substance to enable it to be loaded into the bucket.

3. A power-dredge or excavating bucket provided with means mounted on its upper forward end and in advance of said end and movable independent of the bucket and adapted to operate on the substance to be acted upon and disengage or loosen a portion of the said substance to enable it to be loaded into the bucket.

4. A power-dredge or excavating bucket provided with rotary means mounted on the bucket and in advance of the forward end of the same to act on the substance to be removed to enable it to be loaded into the bucket.

5. A power dredge or excavating bucket provided with rotary means mounted thereon and in advance of the bucket to act upon the substance to be removed and load it into the bucket.

6. A power dredge or excavating bucket provided with a rotary cutter mounted on the bucket and extending partially in advance of the latter to cut away the substance to be removed and transfer it to the bucket.

7. A power dredge or excavating bucket provided with a pair of rotary cutters mounted on the bucket and extending partially in advance of the latter to cut away the substance to be removed and transfer it to the bucket.

8. A power dredge or excavating bucket provided with a pair of rotary cutters mounted on the bucket and means between the cutters for separating them.

9. A power dredge or excavating bucket provided with rotary devices mounted thereon and adapted for cutting or digging away the dirt in advance of and partly above the bucket.

10. A power dredge or excavating bucket provided with rotary devices mounted thereon and constructed and arranged to cut or dig away the dirt in advance of and partly above the bucket and load the former into the latter.

11. A power dredge or excavating bucket provided with rotary devices adapted for cutting or digging away the dirt in advance of and above the bucket, and means intermediate of said devices for rotating them.

12. A dredge bucket provided on its sides with strengthening castings riveted thereto and having lug bearings at their upper ends, and a hoisting bail connected with said bearings.

13. A power excavating bucket, provided with cutters or diggers adapted to operate in front of the bucket, a shaft upon which said cutters or diggers are mounted, means on said shaft for operating the said cutters or diggers, combined with castings secured to the sides of the bucket and having lug bearings at its upper end through which the said shaft is extended, and a hoisting bail strapped to said shaft.

In testimony whereof, I affix my signature, in presence of two witnesses.

GEORGE FRANCIS.

Witnesses:
CHARLES H. PEASE,
GEORGE T. JONES.